Aug. 10, 1965   L. A. TOTH   3,199,329
SCREWDOWN-THRUST BEARING COMBINATION
Filed May 14, 1962   3 Sheets-Sheet 1

LEO A. TOTH
INVENTOR

BY *Mason, Porter, Diller & Stewart*

ATTORNEYS

Aug. 10, 1965  L. A. TOTH  3,199,329
SCREWDOWN-THRUST BEARING COMBINATION
Filed May 14, 1962  3 Sheets-Sheet 2

LEO A. TOTH
INVENTOR

BY Mason, Porter, Miller & Stewart

ATTORNEYS

LEO A. TOTH
INVENTOR a
United States Patent Office 3,199,329
Patented Aug. 10, 1965

3,199,329
SCREWDOWN-THRUST BEARING COMBINATION
Leo A. Toth, South Bend, Ind., assignor to The Torrington Company, Torrington, Conn., a corporation of Maine
Filed May 14, 1962, Ser. No. 194,542
2 Claims. (Cl. 72—248)

The specification which follows relates to an improved antifriction thrust bearing for rolling mills. Constant adjustment in small, precise amounts is required in the spacing of the work rolls in view of the current practice of rolling metal billets, plates and strips at relatively high speed. To make this accurate adjustment by the mill screws without undue friction is the purpose of this invention.

The use of antifriction thrust bearings for this purpose is old but offers certain problems due to limitations in the necessity of providing lateral adjustment between the mill screws and the thrust bearings.

It is an object of the invention to provide a concave roller thrust bearing having a spherical seat for providing increased sensitivity and freedom for lateral or radial adjustment of the bearing members relative to the mill screws.

It is a further object of the inventioin to obtain this improved result without the necessity of using an intermediate bearing block between the screw and the upper race member.

It is a further object of my invention to provide a compact bearing unit with means for coupling the bearing parts together which may be assembled previously and then installed as a complete unitary structure.

As illustrating the invention and by way of example, the preferred forms of the invention are shown on the accompanying drawings in which.

Figure 1:
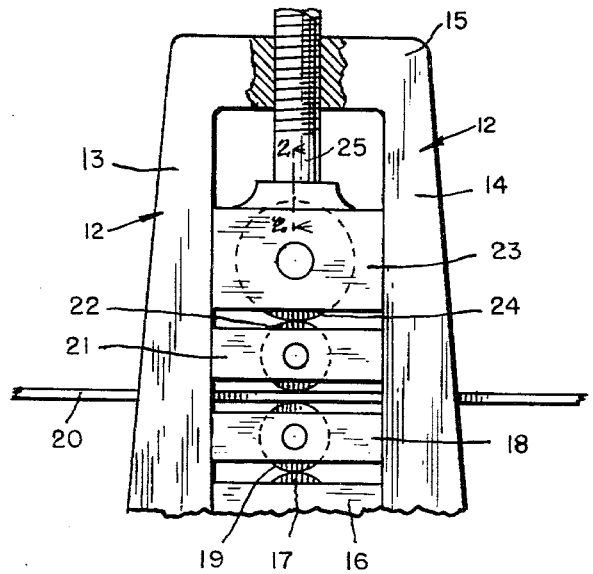
FIGURE 1 is a front elevation, partly in section, of the upper portion of a 4-high rolling mill equipped with the novel thrust bearing.

While the invention has been shown for purposes of illustration in connection with a 4-high rolling mill, it may apply to a two-high mill as well. The mill frame is built up of two opposite pedestals 12, 12. The sides 13 and 14 of these pedestals form parallel guides for the chocks of the mill rollers.

The upper parts of the frames are tied in by means of a bridge member 15.

The 4-high mill comprises bottom chocks 16 which form journal bearings for the back-up roller 17. A second pair of chocks 18 is mounted between the side guide members 13, 14 above the chocks 16. Chocks 18 form journals for the lower work roll 19.

This roll supports the plate or strip 20 which is being flattened and its thickness reduced in the rolling mill.

The guides also carry a pair of chocks 21 above the strip 20. These chocks form journals for the upper work roll 22.

A second pair of chocks 23 above chocks 21 form journals for the back-up roll 24.

Mill screws 25, threaded through the frame members 15 are provided with concave spherical ends 26. These ends bear down as shown diagrammatically in FIGURE 2 on the upper bearing race 30.

Figure 2:
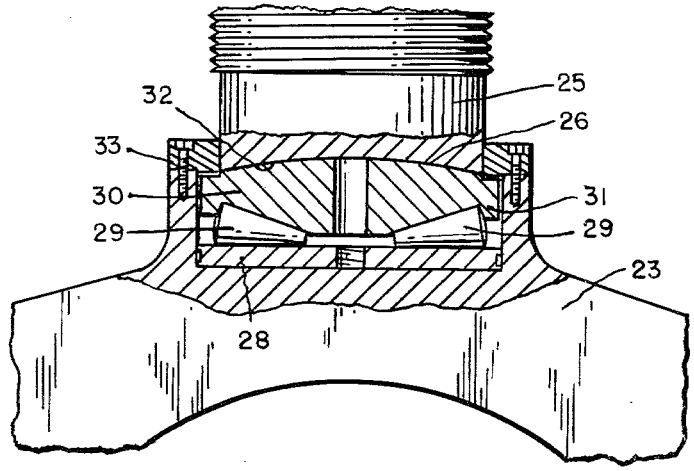
FIGURE 2 is an enlarged vertical section taken on the line 2—2 of FIGURE 1.

The general relationship between the upper chock 23 and the antifriction thrust bearing is shown in more detail in FIGURE 2. Here there is a race member or plate 28 having flat surfaces on the top and bottom resting in a collar 55 formed on the chock 23. A series or full complement of conical bearing rollers 29 rest on the lower raceway 28.

The upper raceway 30 has a lower conical surface which conforms to the slope required to rest upon the rollers 29. The upper raceway has a peripheral flange 31 against which the outer ends of the rollers 29 ride and by which they are confined.

The upper surface of the race member 30 is convex or part-spherical as shown at 32. This serves to support the correspondingly concave end 26 of the hold-down screw 25.

A cover ring 33 is bolted on the chock 23 around the screw 25 and above the upper race member 30.

Figure 3:
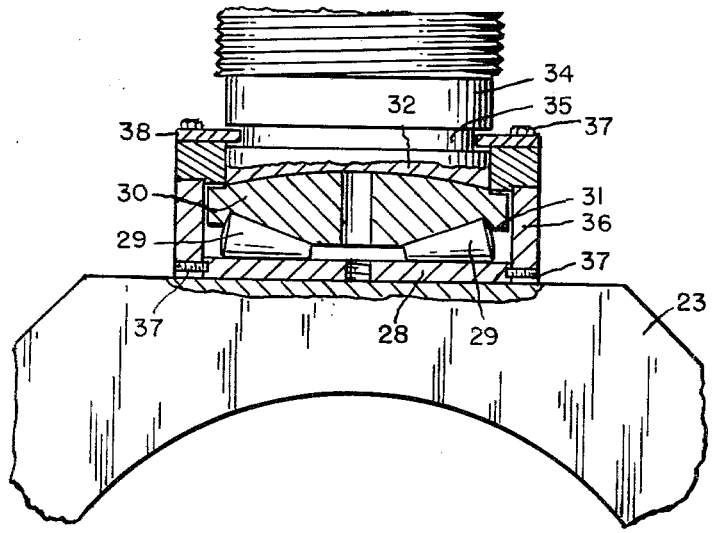
FIGURE 3 is a similar enlarged vertical section of a modified form of the invention.

This bearing unit may be made a captive of the mill screw. This is shown in FIGURE 3, where the mill screw 34 has a peripheral groove 35.

A collar 36 surrounds the race members 28 and 30. Set screws 37 hold the lower race member 28.

The collar includes an inwardly extending flange overhanging the upper raceway 30 and thus the race members are coupled together.

A sectional cover ring 38 is bolted to the collar 36 and extends inwardly, where it is received in groove 35 on the outer surface of the screw 34.

Figure 4:
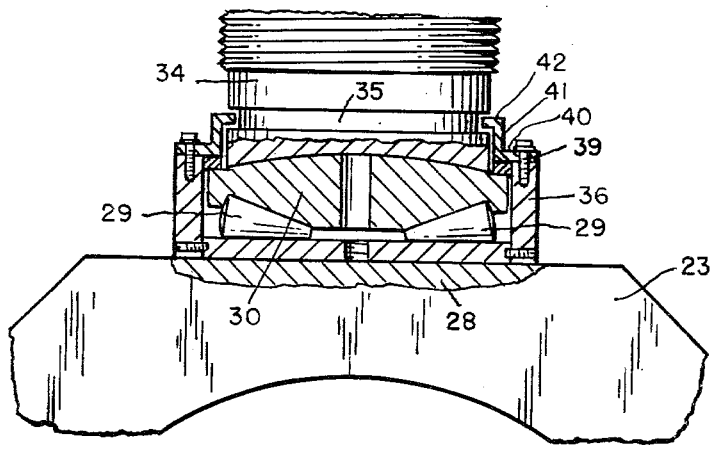
FIGURE 4 is an enlarged side elevation partly in vertical section, of the improved bearing in a different mounting.

A slightly different arrangement of the thrust bearing unit is shown in FIGURE 4. Here the collar 36 is high enough to provide a space above the member 30 in which to receive a filler member or packing 39. This is held down by a split cover ring 40. The cover ring has an upstanding flange 41 with an inwardly projecting rim 42 which fits loosely within the groove 35.

Figure 5:
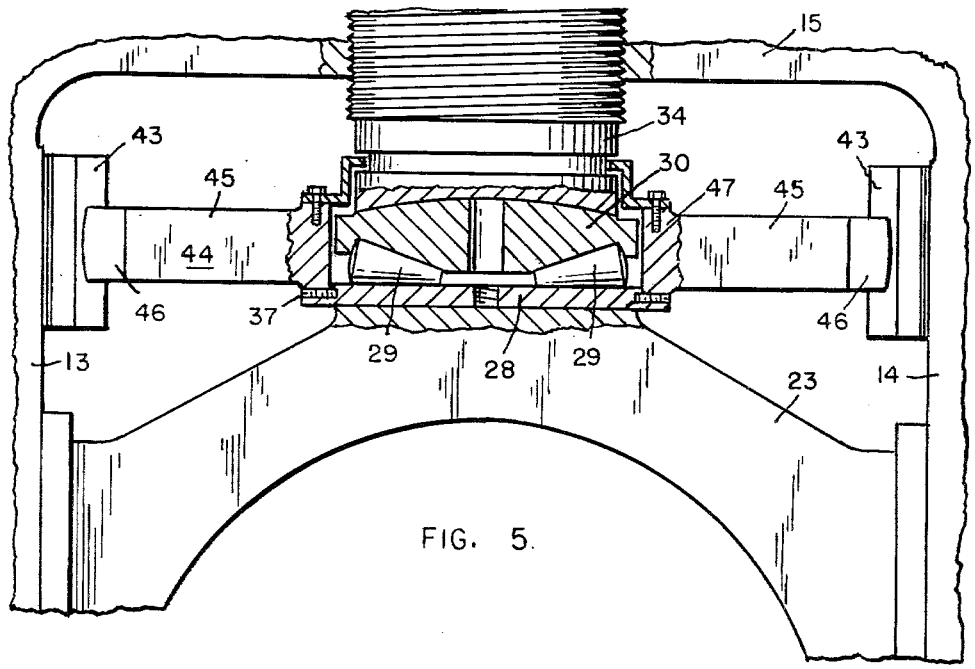
FIGURE 5 is an enlarged side elevation partly in vertical section of a modified form of the invention and FIGURE 6 is a partial vertical section of a still further modification.

Alternatively the bearing unit may be made independent of the chock 23 and guided solely by the side guide members 13 and 14. This form is shown on FIGURE 5. There the side guide members have vertical guide rails 43, 43.

A housing 44 takes the place of the collar around the bearing. This housing has diametrically extending bars 45, 45, terminating in shoes 46, 46, slidable on the rails 43, 43. The center of the housing 44 is in the form of a collar 47. The lower raceway 28 fits within collar 47 and is held in place by set screws 37. The raceway 28 rests slidably on the upper surface of chock 23.

This collar 47 loosely encloses the upper raceway 30 and the rollers 29 in the manner above described. The upper bearing member 30 is free to adjust itself laterally with the mill screw 34, while the lower raceway member 28 is held rigidly with the collar 47.

The mill screw 34 may be withdrawn upwardly, in which case it carries the bearing unit with it, the latter being vertically slidable on the rails 43, 43.

There is also a slidable adjustment possible between the lower race member 28 and the flat top of the chock 23.

Figure 6:
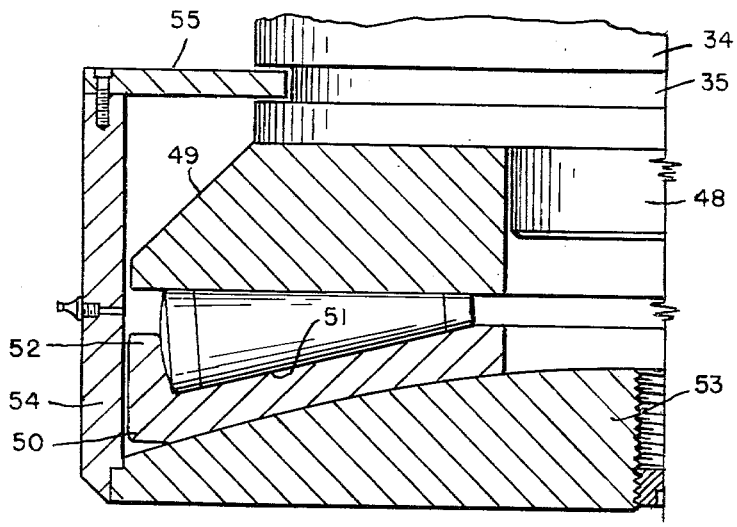

The desired freedom of movement can be provided also by arranging the thrust bearing with the concave, convex surfaces below the conical rollers. This has been shown on FIGURE 6. Here the screw 34 has a central stud 48 which extends downwardly. This forms a journal for a loose annular race member 49. The race member has flat horizontal top and bottom surfaces. An opposite lower race member 50 is provided with a conical raceway 51 and an outer confining rib 52.

The lower race member 50 has a spherical concave lower surface which rests in turn upon a spherical convex upper surface of a plate 53.

The plate 53 is surrounded by a housing 54. This extends upwardly beyond the upper raceway 49 to a point opposite the groove 35 of the mill screw 34. A split collar 55 is bolted to the upper edge of the housing 54. The collar extends into the groove 35. The thrust bearing is therefore formed as a unit which will support the pressure from the screw 34. However, there is sufficient clearance between the stud 48 and the race member 49 and between the lower race member 52 and the housing 54 to permit necessary laterally adjustment relative to the screw 34.

As shown above in detail, provision has been made to supply antifriction thrust bearings between the mill screws of a rolling mill and the upper back-up chocks. This allows for initial misalignment and sensitive and precise adjustment of pressure in extremely small increments.

While I have shown and described the preferred forms of the invention, it will be evident that minor changes in structural details, material and proportions are possible within the scope of the following claims.

What I claim is:

1. A screw-down antifriction thrust bearing comprising in combination with a mill screw having a concave end surface, a lower race member having flat top and bottom surfaces, an upper race member having a convex upper surface, a series of tapered rollers between said members, said screw and said upper race member together forming a concavo-convex bearing and means for coupling together the lower race member and the mill screw.

2. In combination with a pressure screw having a peripheral groove and a concave lower end, a collar, a flat lower race member carried by the collar, an upper race member in the collar having a convex upper surface fitting the end of the screw, bearing rollers between the race members, and a split ring carried by the collar loosely in the groove of the screw.

References Cited by the Examiner

UNITED STATES PATENTS

| | | | |
|---|---|---|---|
| 1,084,107 | 1/14 | Pisarcik | 80—56 |
| 2,161,768 | 6/39 | Smitmans | 308—166 |
| 2,451,683 | 10/48 | Mantle | 308—227 |
| 2,734,407 | 2/56 | Smith | 80—56 |
| 2,905,964 | 9/59 | Hull | 308—231 |
| 3,055,243 | 9/62 | Cauley et al. | 80—57 |
| 3,132,547 | 5/64 | Doyle et al. | 80—56 |

CHARLES W. LANHAM, *Primary Examiner.*

WILLIAM J. STEPHENSON, *Examiner.*